9893X
A. Roff,
Lock.
Patented July 2, 1836
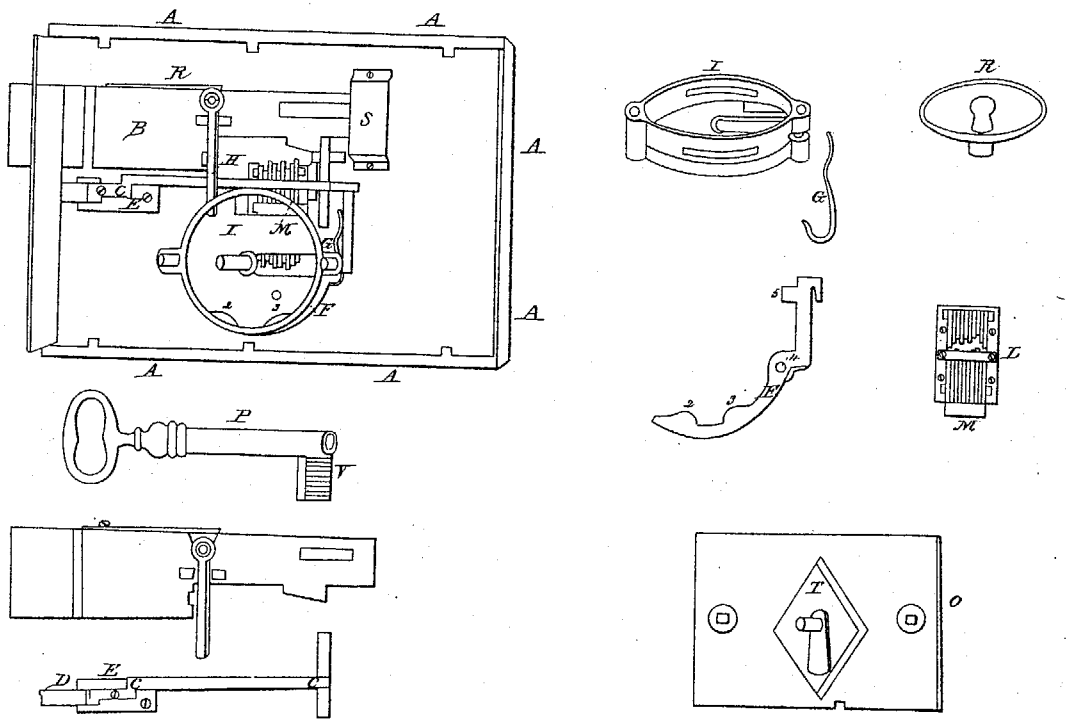
AM. PHOTO-LITHO. CO. N.Y. (OSBORNE'S PROCESS.)

7/2/1836 9893X

[illegible] 1836 2

[illegible]

The Schedule [illegible] Black oak

[illegible] part of the same [illegible]

of the [illegible]

the [illegible]

[illegible]

[illegible]

of the [illegible]

[illegible]

[illegible]

of [illegible]

AAAA is the [illegible]

B is the main [illegible]

CC is the [illegible]

D is the [illegible] B

E is the [illegible] in which the [illegible]

F is the [illegible]

of the [illegible]

[illegible]

G is the Spring [illegible] the [illegible] proper position [illegible]

H is the [illegible] on which the [illegible] of the revolving plate [illegible] is made [illegible] the [illegible]

to [illegible] the [illegible]

I is the [illegible] in which the [illegible] plate works

K is the revolving plate [illegible] around the spindle

7/2/1836 9893X

T is the which the barrel of the key turns

L is the key in which the barrel is

U represents any number of pins, further and farther

O is the tap to which the wards are the [illegible]

and [illegible] plan to this plan

P is the key with many pins and the [illegible]

is different depth and corresponding to the lock of the lock which is [illegible]

R is a small spring which is the main [illegible] (B)

to hold the bolt [illegible] and [illegible] to let the key spring up to its [illegible] and [illegible]

way a hole is the key also [illegible]

[illegible]

S is a spring for the [illegible]

T is the [illegible] which the barrel of the key turns

U is the [illegible] key hole

W is a [illegible] for the key [illegible]

[illegible] the key [illegible]

[illegible] the [illegible] of [illegible]

[illegible] which [illegible]

claimed. I claim the combination of said parts of [illegible]

with the [illegible] and such together as [illegible]

(Said the key P D [illegible]

[illegible] and [illegible] [illegible]

[illegible] the key [illegible]

[illegible]

[illegible]

[ at Y released at the notch at Z and returning back as far as the
Dog C springs. The key is now to be drawn out of the same
key hole and turned so as to strike the bow latch II through
the agency of the revolving plate K in which the key works
as aforesaid. [illegible] that is the main bolt drawn and the lock
if on a door fasten the door. The key [illegible] must be turned
all the way around and the revolving [illegible] so that part
of it (b) in which the key works will strike the belly (a)
and thus with the sliding bar F by the [illegible] drive
out the dog O to catch hold on the main bolt as at Y and
the tumblers will then fall behind the dog C and hold
said Dog [illegible] so that the main bolt cannot be moved
but if it should be required to unlock the lock the key
is to be drawn into the same key hole as above mentioned
and thus turned say two hundred and twenty degrees
or about three [illegible] of the way around so as to carry
the bit of the key past the bow latch II then by turn-
ing the key backward the bolt is drawn back and the
tumblers fall by the operation as aforesaid on the belly
(a) in like manner as the belly (b)

Together with the combination of parts as above
described to work as above explained I claim the
several parts as my invention to wit.

1st I claim the [illegible] bar as seen in the draw-
ing and model to be used to press into a dog like C.

2d I claim the key with grooves or bands along
the side of the bit to work on the lower ends of ver-
tical sliding tumblers and all other tumblers where a
dog like C is used in connection with it for the purpose
it is used in my combination above described.

3d I claim the bow latch as it is applied
to the main bolt for the purpose of drawing a bolt
in connection with vertical sliding tumblers and 7/2/1836 9893x

28.

[illegible]

Witnesses

Saml. McDyer[illegible] Ulmer Neff

Ishiah Hollar

Exhibit [illegible]

979

Drawing